Aug. 10, 1965                O. E. VESTAL ETAL                3,199,837
                    AUTOMOBILE FRONT END ALIGNMENT TOOL
Filed June 28, 1963                                         2 Sheets-Sheet 1

INVENTORS.
Odrah E. Vestal
BY James E. Ulry

ATTORNEYS.

INVENTORS.
Odrah E. Vestal
James E. Ulry

United States Patent Office 3,199,837
Patented Aug. 10, 1965

3,199,837
AUTOMOBILE FRONT END ALIGNMENT TOOL
Odrah E. Vestal, Rte. 1, Grain Valley, Mo., and James E. Ulry, 6940 Avalon, Parkville, Mo.
Filed June 28, 1963, Ser. No. 291,385
9 Claims. (Cl. 254—1)

This invention relates generally to tools for use in aligning the front suspension of an automobile and, more specifically, to an alignment tool especially suited for adjusting the caster and camber of the wheel of an automobile.

It is the primary object of this invention to provide an apparatus for facilitating the adjustment of the caster and camber of the front wheels of an automobile and for eliminating the trial and error alignment techniques frequently used heretofore.

It is another important object of this invention to provide a front end alignment tool especially suitable for adjusting the caster and camber of the front wheels of Ford Fairlanes and Mercury Meteors produced during 1962–63.

Another object of this invention is to provide a wheel alignment tool that will maintain the automobile upon which it is used at curb height during adjustment of the caster and camber of the front wheels. In this manner the operator is assured that the settings of these angles will be the same both while the tool is being employed in the adjusting operation and subsequent to removal of the tool from the automobile.

It is a further object of this invention to provide a wheel alignment tool adapted to be coupled with the upper arm assembly of an automobile front wheel suspension that will shift the assembly during alignment of the front end by direct manual operation rather than through the use of wrenches, hammers, or other tools to supplement the strength of the operating mechanic.

Yet another object of this invention is to provide a wheel alignment tool that may be employed by the operating mechanic to decrease as well as increase the camber and caster of a wheel under alignment.

Other objects will become apparent as the detailed description proceeds.

In the drawings:

FIG. 4 is a fragmentary, detailed view partially in section and partially in elevation showing one end of the longitudinally extensible and retractable device and the support in operative association with the supper ball joint of the automobile suspension;

FIG. 5 is a fragmentary, detailed, elevational view of the end of the longitudinally extensible and retractable device which engages the upper ball joint;

FIG. 6 is a fragmentary, detailed, elevational view of the brace of the instant invention showing the structure utilized to attach the brace to the lower arm assembly of the automobile; and FIG. 7 is a sectional view taken along line 7—7 of FIG. 6.

Referring to the figures, a longitudinal frame member 10 is shown extending alongside a front wheel drum 12 of an automobile. Member 10 forms a part of the structural undercarriage of the automobile and is joined with a cross member 14. A bracket 16 is also attached to member 10, the bracket serving as a means for supporting the front bumper (not shown) of the automobile.

Figure 1:
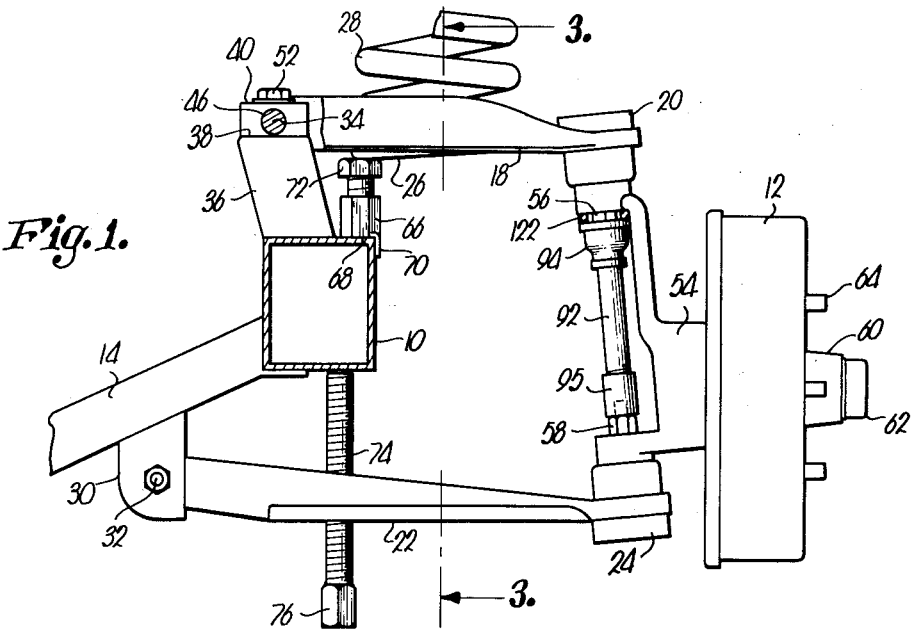
FIGURE 1 is an elevational view of certain components of the instant invention in their operative positions on an automobile, the front suspension structure of the automobile being shown in fragmentary, frontal elevation with a longitudinal frame member shown in section and the truss rod and stabilizer removed for clarity.
Figure 2:
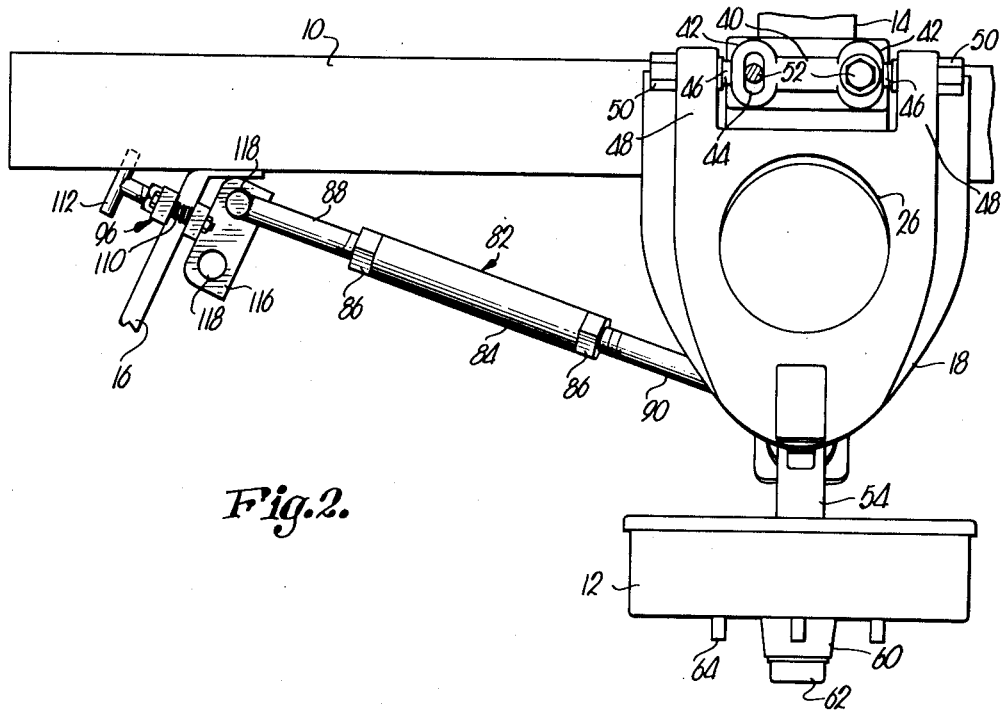
FIG. 2 is a fragmentary plan view of the automobile front suspension showing certain other components of the instant invention in elevation in their operative positions, the truss rod and stabilizer of the automobile being removed for clarity.

The structure shown in FIGS. 1 and 2 may be recognized as a ball joint front suspension, the truss rod and the stabilizer of the automobile undercarriage being removed for clarity. The suspension comprises an upper arm 18, an upper ball joint 20 mounted on the arm 18, a lower arm 22, and a lower ball joint 24 attached to arm 22. Arm 18 is provided with a socket 26 which receives a coil spring 28, the upper end thereof (not shown) being attached to the undercarriage in the conventional manner.

Lower arm 22 is secured to the automobile by means of a pivotal connection with a mounting ear 30 rigid with member 14. Arm 22 is free to swing about a generally horizontal axis which is perpendicular to the drawing shown in FIG. 1 through a point indicated at 32. It will be appreciated that swinging movement of arm 22 occurs while the automobile is traveling over the contours of the road surface.

The upper arm 18 is also free to swing about a generally horizontal axis perpendicular to the drawing of FIG. 1 through a point indicated at 34. When the automobile is at rest, the action of coil spring 28 maintains the arms in the positions shown.

The upper arm 18 is pivotally coupled with an extension 36 of member 10, the extension 36 presenting a horizontal mounting surface 38. Upon surface 38 a mounting device 40 is disposed, said device being provided with a pair of bosses 42, a pair of slots 44 extending through corresponding bosses 42, and a pair of opposed, threaded studs 46.

A pair of mounting legs 48 integral with arm 18 are apertured to receive a pair of bushings 50, the bushings 50 being threadably received by corresponding studs 46. Mounting device 40 is held rigid with extension 36 by a pair of bolts 52 which extend through slots 44 and are received by tapped holes or nuts (not shown) in extension 36. Slots 44 permit adjustment of the disposition of arm 18 when bolts 52 are loosened and thus enable the caster and the camber of the wheel attached to drum 12 to be varied to properly align the front suspension of the automobile.

A spindle assembly 54 is secured to ball joints 20 and 24 by fasteners 56 and 58 respectively. Fasteners 56 and 58 are nuts which are received by threaded members extending from the ball joints. Drum 12 is provided with a hub 60, the drum and the hub being slipped on the spindle assembly 54 and held in place by the wheel bearings and nut and washer means (not shown). A cap 62 prevents foreign particles from fouling the bearings, and a plurality of lug bolts 64 are provided for the mounting of the wheel in the conventional manner.

Those skilled in the art will recognize the structure above described and shown in FIGS. 1 and 2 as being a part of the front suspension of a 1962–63 Ford Fairlane or Mercury Meteor. In these automobiles access to bolts 52 is provided by openings in the automobile undercarriage (not shown). These openings, however, are quite small and permit only the insertion of a wrench or other means to loosen and tighten the bolts.

The alignment of the front ends of the aforesaid automobiles is rendered difficult due to the limited access provided to upper arm 18. This arm must be shifted in a generally horizontal plane in order to properly adjust the caster and camber of the associated front wheel. The instant invention eliminates this inconvenience and permits accurate front end adjustment heretofore unobtainable with the same speed through the use of tool components to be now described.

Figure 3:
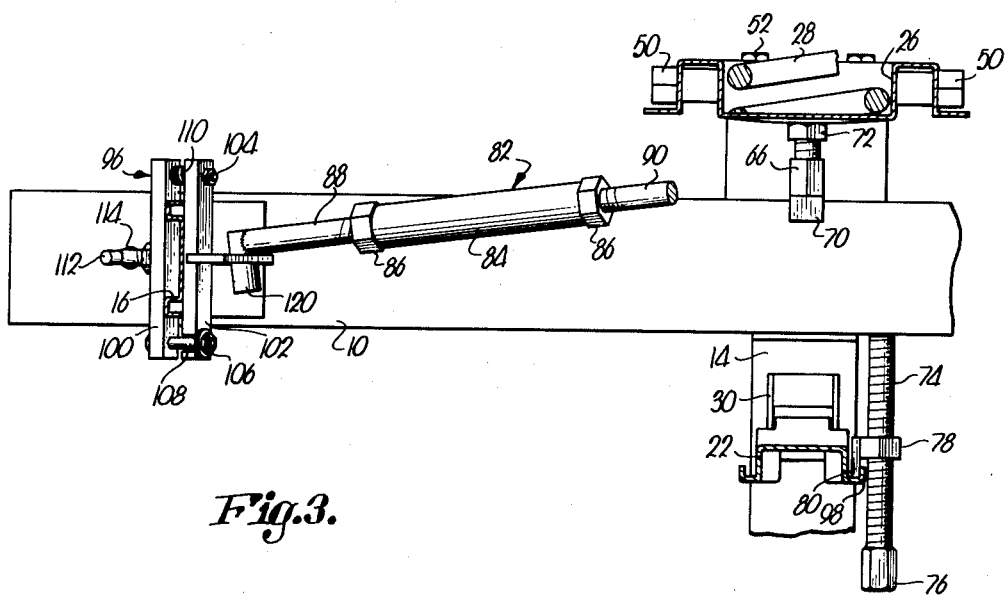
FIG. 3 is a sectional view taken along line 3—3 of FIG. 1 revealing the longitudinally extensible and retractable device which is not shown in FIG. 1 because of the section through the longitudinal frame member.

FIGURES 1 and 3 reveal a block 66 disposed on ledge 68 of member 10, the block 66 being provided with a depending lip 70 in engagement with member 10 and an adjustable cap screw 72 extending upwardly from the block and into engagement with the underside of the coil socket 26 of arm 18. In FIGS. 1, 3, 6 and 7 a brace 74 is shown having a wrench receiving part 76 and a nut 78 threaded thereon and provided with a depending flange 80. FIGURES 2, 3, 4 and 5 reveal an elongated, longitudinally extensible and retractable device 82 having a central barrel 84 provided with wrench-receiving portions 86, and a pair of opposed shafts 88 and 90 which have reverse threads and are received by barrel 84. FIGURES 1 and 4 show a support 92 provided with a socket 94 and a sleeve 95, and FIGS. 2 and 3 reveal a clamp generally designated 96.

Brace 74 is mounted on the automobile by engaging flange 80 with an upturned edge 98 of arm 22 as is evident from FIG. 3. Wrench part 76 is then rotated to bring the opposite end of brace 74 into engagement with the underside of member 10.

Clamp 96 is provided with a pair of clamp arms 100 and 102. Clamp arms 100 and 102 are held together by nut and bolt assemblies 104 and 106, arm 102 being slotted at 108 to permit swinging of the arm bolt assembly 104. A spring 110 surrounds the bolt of assembly 104 to facilititate the operation of the clamp. A T-shaped member 112 is rigid with arm 100 and is received by an opening 114 in member 10 in the manner shown in FIG. 3 for purposes to be hereinafter explained.

A plate 116 rigid with arm 102 of clamp 96 has a pair of holes 118 therein for receiving the terminal end 120 of shaft 88 of device 82. End 120 makes a right angle with respect to shaft 88 to form a hook for insertion into one of the holes 118.

The terminal end 122 of shaft 90 of device 82 is flat and contains an eye 124 therethrough. This configuration is clearly revealed in FIG. 5. Eye 124 slips over fastener 56 of ball joint 20 as revealed in FIG. 4. Sleeve 95 of support 92 forms the normally lowermost end of the support and facilitates the disposition of the support on fastener 58 of lower ball joint 24. The socket 94 of support 92 forms the normally uppermost end thereof, the support being of such length that socket 94 slips over fastener 56 and engages the flattened end 122 of shaft 90 when device 82 is mounted on the automobile. Thus, as is especially clear in FIG. 4, it may be appreciated that support 92 serves to maintain end 122 in engagement with fastener 56.

In the operation of the tool of the instant invention, block 66 and brace 74 are mounted on the automobile and adjusted until cap screw 72 snugly engages the underside of socket 26 and the upper end of brace 74 engages the underside of member 10. Neither the block nor the brace need be forceably engaged with the automobile structure, it being only necessary that they be mounted thereon to prevent movement of arms 18 and 22 relative to member 10.

The importance of block 66 and brace 74 is readily appreciated when it is considered that the front end of an automobile should properly be aligned while the car is maintained at curb height. Curb height is specified by the manufacturer of the particular automobile. Thus, with block 66 and brace 74 in place, raising or lowering of the automobile undercarriage is impossible since the undercarriage and the suspension are interlocked.

Clamp 96 is mounted on bracket 16 with the T-shaped member inserted in opening 114. Since bracket 16 comprises the bumper support on the aforesaid Ford and Mercury automobiles, member 112 is provided to relieve the strain on bracket 16 by transmitting the torsional forces to member 10 that will be applied to the clamp during operation of device 82. The longitudinal frame members 10 of the aforesaid automobiles have openings 114 therein; therefore, it is not necessary in these vehicles to bore a suitable hole in member 10.

The end 120 of device 82 is inserted in the hole 118 of plate 116 that is proximal to member 10. Thus, clamp 96 is adapted for either the right or the left front wheel. The hole 118 next to member 10 is used due to the decrease in the strain placed on bracket 16 by this disposition of the hole.

The end 122 of device 82 is slipped over fastener 56 and support 92 placed between the ball joints 20 and 24 in the manner shown to maintain end 122 in engagement with the fastener. Bolts 52 of mounting device 40 may then be loosened, preferably one at a time, and barrel 84 rotated to shift arm 18. Normally, barrel 84 may be directly manually operated. However, in the event that arm 18 is unusually stubborn wrench portions 86 are provided to assure that barrel 84 may be easily and conveniently rotated.

Since the threads on shafts 88 and 90 are reversed with respect to one another, rotation of barrel 84 causes the shafts to shift longitudinally and extend or retract depending upon the direction of rotation of the barrel. By suitable tightening and lossening of bolts 52 in the conventional manner, it is apparent that arm 18 will be shifted while arm 22 is held rigid to thereby vary the caster and camber of the wheel until proper alignment is obtained.

It should be understood that, once the proper amount of caster and camber for the particular automobile is obtained, the tool of the instant invention may be removed from the automobile with absolute assurance that such caster and camber will not change. Manifestly, arm 18 is not permitted during shifting thereof to move downwardly, nor is arm 22 allowed to swing upwardly during actuation of device 82; therefore, curb height remains constant during the entire alignment operation to assure that the caster and camber readings will not change after removal of the tool.

Having thus described the invention, what is claimed as new and desired to be secured by Letters Patent is:

1. For use with an automobile of the type having a frame, a pair of front wheels, and suspension means for suspending each front wheel respectively from the frame including a lower arm operably coupled with the wheel and pivotally mounted on the frame for swinging movement about a generally horizontal axis, an upper arm operably coupled with the wheel, the frame including a member disposed between the arms, and releasable means pivotally mounting the upper arm on the frame for swinging movement about a generally horizontal axis and, upon release thereof, for shifting movement in directions to vary the caster and camber of the wheel to properly align the latter, a tool for adjusting the caster and camber comprising:

bracing means for engagement with said member and said upper and lower arms for maintaining the spacing between the member and the arms constant during said shifting movement of the upper arm to align the wheel; and adjustable means for disposition between said upper arm and said frame and adapted for coupling with the upper arm for shifting the latter in said directions to vary the caster and camber of the wheel upon release of said releasable means.

2. The invention of claim 1, wherein said bracing means comprises a block for disposition between said member and said upper arm and a brace for attachment to said lower arm at a position thereon permitting engagement of the brace with the member.

3. The invention of claim 1, wherein said adjustable means is adapted for coupling with the frame for exerting force between said frame and said upper arm.

4. The invention of claim 3, wherein said adjustable means comprises an elongated, longitudinally extensible and retractable device having opposed ends for coupling with the frame and the upper arm respectively.

5. For use with an automobile of the type having a frame, a pair of front wheels, and suspension means for suspending each front wheel respectively from the frame including a lower arm operably coupled with the wheel and pivotally mounted on the frame for swinging movement about a generally horizontal axis, an upper arm operably coupled with the wheel, and releasable means pivotally mounting the upper arm on the frame for swinging movement about a generally horizontal axis and, upon release thereof, for shifting movement in directions to vary the caster and camber of the wheel to properly align the latter, a tool for adjusting the caster and camber comprising:
- an elongated, longitudinally extensible and retractable device having opposed ends, one of said ends being adapted for coupling with said upper arm;
- a support adapted to be carried by said lower arm for engagement with said one end to maintain the latter coupled with the upper arm; and
- structure for attachment to said frame at a location thereon spaced from said upper arm, said structure including means for receiving the other end of said device.

6. The invention of claim 5, wherein said automobile is of the type where a ball joint is employed to couple each arm with the wheel, the joint for the upper arm having a fastener extending therefrom, and wherein said one end of the device is for engagement with said fastener, said support engaging said one end to support the latter when the one end is engaged with the fastener.

7. For use with an automobile of the type having a frame, a pair of front wheels, and suspension means for suspending each front wheel respectively from the frame including a lower arm pivotally mounted on the frame for swinging movement about a generally horizontal axis, a lower ball joint operably coupling the arm with the wheel, an upper arm, an upper ball joint operably coupling the upper arm with the wheel and having a fastener extending therefrom, the frame including a member disposed between the arms, and releasable means pivotally mounting the upper arm on the frame for swinging movement about a generally horizontal axis and, upon release thereof, for shifting movement in directions to vary the caster and camber of the wheel to properly align the latter, a tool for adjusting the caster and camber comprising:
- a block for disposition between said member and said upper arm for engagement therewith to maintain the spacing between the member and the upper arm constant during said shifting of the upper arm to align the wheel;
- a brace for attachment to said lower arm at a position thereon permitting engagement of the brace with said member to prevent movement of the member and the lower arm toward one another; and
- an elongated, longitudinally extensible and retractable device having opposed ends, one of said ends being adapted for engagement with said fastener, the other end being adapted for coupling with said frame at a location thereon spaced from said upper arm permitting said device to shift the upper arm in said directions to vary the caster and camber of the wheel upon release of said releasable means and actuation of said device.

8. The invention of claim 7, wherein is provided a support for disposition between said ball joints, said support being mounted on the lower joint and in supporting engagement with said one end of the device when the one end is engaged with said fastener.

9. The invention of claim 7, wherein is provided structure for attachment to said frame at said location, said structure including means for receiving said other end of the device.

No references cited.

WILLIAM FELDMAN, *Primary Examiner.*